US010609443B2

(12) United States Patent
Wu et al.

(10) Patent No.: US 10,609,443 B2
(45) Date of Patent: Mar. 31, 2020

(54) METHOD, APPARATUS AND SYSTEM FOR DISCOVERING AND DISPLAYING INFORMATION RELATED TO VIDEO CONTENT

(71) Applicant: Tagflix Inc., San Francisco, CA (US)

(72) Inventors: Timothy Wu, San Francisco, CA (US); Marcus Ehrenblad, San Francisco, CA (US)

(73) Assignee: Tagflix Inc., San Francisco, CA (US)

( * ) Notice: Subject to any disclaimer, the term of this patent is extended or adjusted under 35 U.S.C. 154(b) by 0 days.

(21) Appl. No.: 15/951,112

(22) Filed: Apr. 11, 2018

(65) Prior Publication Data

US 2018/0295408 A1  Oct. 11, 2018

Related U.S. Application Data

(60) Provisional application No. 62/484,195, filed on Apr. 11, 2017.

(51) Int. Cl.
| | |
|---|---|
| *H04N 21/435* | (2011.01) |
| *H04N 21/80* | (2011.01) |
| *H04N 21/432* | (2011.01) |
| *H04N 7/025* | (2006.01) |
| *H04N 21/84* | (2011.01) |
| *H04N 21/81* | (2011.01) |
| *H04N 21/234* | (2011.01) |

(52) U.S. Cl.
CPC ......... *H04N 21/435* (2013.01); *H04N 7/0255* (2013.01); *H04N 21/23418* (2013.01); *H04N 21/4325* (2013.01); *H04N 21/80* (2013.01); *H04N 21/8126* (2013.01); *H04N 21/84* (2013.01)

(58) Field of Classification Search
CPC ... H04N 7/0255; H04N 21/80; H04N 21/4325
See application file for complete search history.

(56) References Cited

U.S. PATENT DOCUMENTS

| | | | |
|---|---|---|---|
| 9,058,385 B2* | 6/2015 | Kocks | G06K 9/00718 |
| 2009/0063277 A1* | 3/2009 | Bernosky | G06Q 30/0247 705/14.73 |
| 2009/0213270 A1 | 8/2009 | Ismert et al. | |

(Continued)

OTHER PUBLICATIONS

International Search Report and Written Opinion dated Jul. 30, 2018 for Application No. PCT/US2018/027196, 12 pages.

*Primary Examiner* — Thai Q Tran
*Assistant Examiner* — Jose M Mesa
(74) *Attorney, Agent, or Firm* — Moser Taboada

(57) ABSTRACT

Methods, apparatus and systems for processing and tagging at least a portion of a video with metadata are provided herein. In some embodiments, a method for processing and tagging at least a portion of a video with metadata includes extracting a plurality of frames from the video, generating a fingerprint for each frame of the plurality of frames, or for a set of frames of the plurality of frames, determining contextual data within at least one frame or set of frames, associating the generated fingerprint of each frame or set of frames with the determined contextual data, and storing the association of the fingerprint of each frame or set of frames and the contextual data.

16 Claims, 12 Drawing Sheets

(56) References Cited

U.S. PATENT DOCUMENTS

| | | | |
|---|---|---|---|
| 2011/0135283 A1* | 6/2011 | Poniatowki | H04N 21/278 |
| | | | 386/297 |
| 2012/0072947 A1 | 3/2012 | Choi et al. | |
| 2012/0110043 A1 | 5/2012 | Cavet et al. | |
| 2013/0108239 A1 | 5/2013 | Ryer et al. | |
| 2014/0053214 A1* | 2/2014 | Walker | H04N 21/2187 |
| | | | 725/62 |
| 2015/0121419 A1* | 4/2015 | Wellen | G06F 17/20 |
| | | | 725/32 |
| 2016/0205431 A1* | 7/2016 | Avedissian | G06F 3/0481 |
| | | | 725/37 |
| 2017/0330598 A1* | 11/2017 | Choi | G11B 27/11 |
| 2018/0063593 A1* | 3/2018 | Arokiaraj | H04N 21/8126 |
| 2018/0068410 A1* | 3/2018 | Pavetic | G06K 9/4604 |

\* cited by examiner

METHOD, APPARATUS AND SYSTEM FOR DISCOVERING AND DISPLAYING INFORMATION RELATED TO VIDEO CONTENT

CROSS-REFERENCE

This application claims benefit of U.S. Provisional Patent Application No. 62/484,195 filed Apr. 11, 2017, which is incorporated herein in its entirety.

BACKGROUND

Field of the Invention

Embodiments generally relate to a methods, apparatuses and systems for video processing and particularly towards methods, apparatuses and systems for discovering and displaying information related to video content.

Description of the Related Art

Significant difficulty exists in making media smart, in the form of video data discoverable, shoppable, shareable, searchable and able to be indexed. While many technologies address tagging videos contextually, these technologies often obstruct a user's interaction with the particular video and clutter the user interface diminishing the user experience.

Additionally, each video publisher or video on-demand provider generally organizes their data differently. This exponentially increases the difficulty in providing a system that is platform agnostic, yet can still find individual frame data or scenes.

Therefore there is a need in the art for an improved system for discovering information related to video content.

SUMMARY

Methods, apparatus and systems for processing and tagging at least a portion of a video with metadata are provided herein. In some embodiments, a method for processing and tagging at least a portion of a video with metadata includes extracting a plurality of frames from the video, generating a fingerprint for each frame of the plurality of frames, or for a set of frames of the plurality of frames, determining contextual data within at least one frame or set of frames, associating the generated fingerprint of each frame or set of frames with the determined contextual data, and storing the association of the fingerprint of each frame or set of frames and the contextual data.

In some embodiments, a method for obtaining and displaying contextual information related to a video includes performing playback of a video comprising a plurality of frames, obtaining a fingerprint of a frame being displayed, requesting contextual data stored in association with the fingerprint of the frame being displayed, receiving the requested contextual data stored in association with the fingerprint of the frame being displayed, and displaying the contextual data over a portion of the frame in an unobtrusive form as the frame is being displayed.

In some embodiments, a method for presenting contextual information related to a video includes receiving contextual information related to one or more frames in a video currently being displayed in a user interface on a display screen, modifying an amplitude of a video scrubber based on an amount of video metadata received based on a fingerprint of the frame or scene currently being displayed, displaying, in a first portion of the user interface, the video scrubber with portions of the video scrubber displaced vertically reflecting the modified amplitude, receiving event information representing a user selection of a portion of the video scrubber, and displaying, in a second portion of the user interface, a plurality of data points related to the frame being displayed.

Other and further embodiments of the present disclosure are described below.

BRIEF DESCRIPTION OF THE DRAWINGS

So that the manner in which the above recited features can be understood in detail, a more particular description of the invention, briefly summarized above, may be had by reference to embodiments, some of which are illustrated in the appended drawings. It is to be noted, however, that the appended drawings illustrate only typical embodiments and are therefore not to be considered limiting of its scope, for the invention may admit to other equally effective embodiments.

Figure 1:
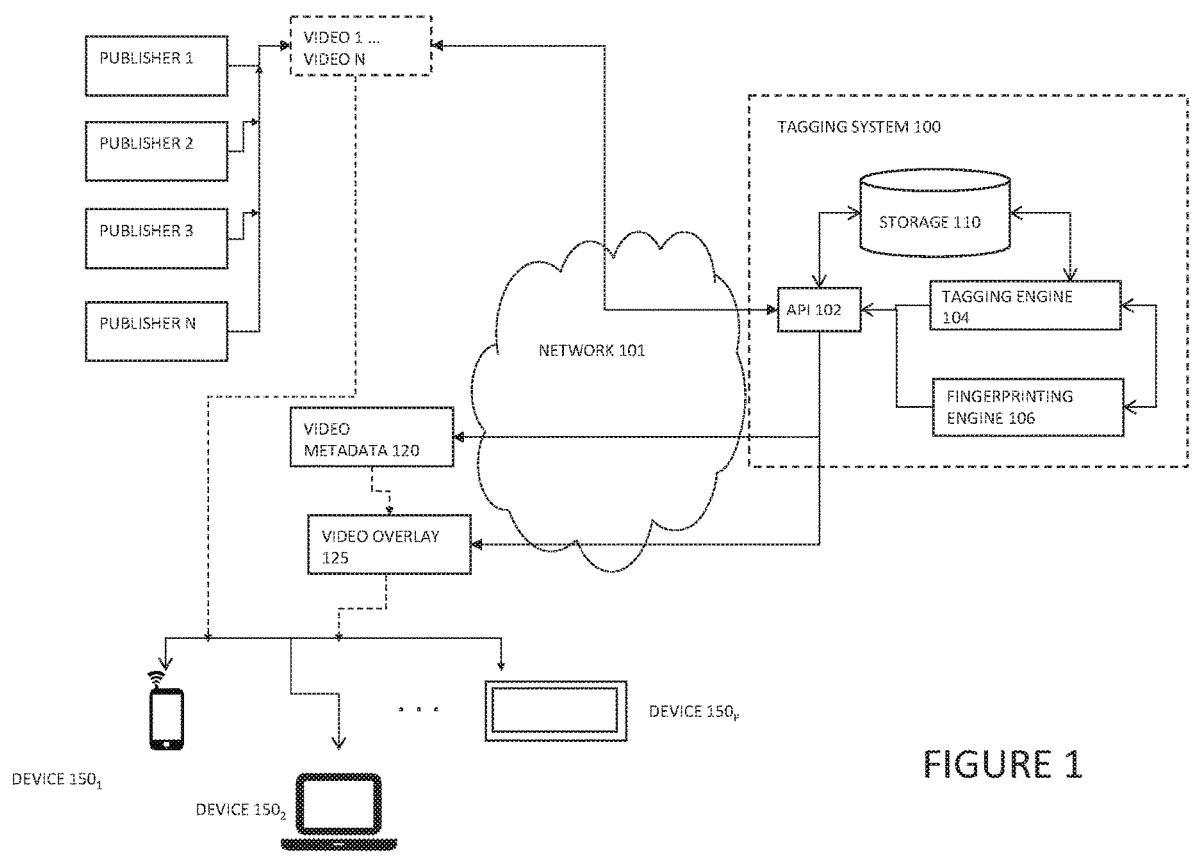
FIG. 1 depicts a block diagram of a system in accordance with exemplary embodiments presented herein.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments consistent with the present disclosure generally relate to methods, apparatus and systems for video processing, and particularly towards methods, apparatus and systems for discovering and displaying information related to video content. According to at least one embodiment, a system comprising a backend video tagging system enables the ingestion of video content from various publishers across the web, in addition to video data submitted directly to the tagging system and not offered from publishers. Each of these videos are processed and frames in the videos are fingerprinted so that they are searchable in real-time. Other processes in the tagging system include associating the processed and fingerprinted frames of individual videos with contextual data which may include information regarding what appears in that frame or information related to what appears. All of the contextual data is associated with frame fingerprints in a video graph that is searchable real time in order to produce the contextual data in an unobtrusive manner.

This enables a platform agnostic association of video frames with contextual information about what appears in those frames without relying on video timelines, which differ across publishers and video hosting sites. For participating publishers and video hosting sites, the backend API communicates a video overlay which comprises a video interface for viewing a video and providing information regarding the video in an unobtrusive manner. The video interface allows a viewer to easily determine what brands, people, places, products, and the like, appear in a particular frame. The video interface also ties the frequency or amount of indexed items in a particular frame to the overlay element that tracks the video viewing location with respect to length of the video.

FIG. 1 depicts a block diagram of a tagging system 100 in accordance with exemplary embodiments presented herein.

Publishers 1 to N create and publish videos from various artists, performers, or the like either on their own site or through video channels and video hosting sites which are generally well known. Videos 1 to N are published and viewed by viewers (alternatively referred to as users) on devices $150_1$ to $150_P$. However, prior to viewing videos 1 to N on devices $150_1$ to $150_P$, the videos are tagged and processed by tagging system 100. The tagging system 100 generates video metadata 120 and couples the video metadata 120 to a video overlay 125. The video overlay 125 is then transmitted to devices $150_1$ to $150_P$ for display over the videos 1 to N. Example embodiments of the video overlay 125 are shown in FIG. 4A-4D. It is noted that the video overlay overlays the video as embedding the information directly in the video would lose the interactive element described herein. The devices $150_1$ to $150_P$ may include tablet computers, mobile devices, laptops, desktop computers, set-top boxes such as APPLE TV, smart televisions and the like. Those of ordinary skill in the art will recognize that the present embodiments allow for the tagging system 100 to be accessed from any source capable of transmitting or displaying videos.

The tagging system 100 comprises a video tagging application programming interface (API) 102, a tagging engine 104, and a fingerprinting engine 106 and storage 110. The tagging system 100 receives and processes videos 1 to N in various formats by extracting individual frames, or collections of frames representing scenes in the video. The fingerprinting engine 106 generates an identifying fingerprint for each frame, through an algorithm that generates a perceptual hash, or a set of frames, from each of the videos 1 to N. The perceptual hash can be looked up at a later time through calculation of hamming distances. A fingerprint is a unique identifier that uniquely identifies each frame or a set of multiple frames. In some embodiments, the fingerprint is generated based on information extracted related to the frame or set of frames (e.g., timestamp, frame numbers, image pixel clusters, or the like).

In some embodiments, each identified frame is tagged by the tagging engine 104. In some embodiments, sets of frames are tagged by the tagging engine 104. More specifically, the tagging engine 104 of the tagging system 100 performs processing on each of those individual frames or collections/sets of frames and associates (i.e., tags) the fingerprinted frames or collection of frames with contextual information, or metadata. The associated frame and contextual metadata information is stored in storage 110 for retrieval.

In some embodiments, publishers 1 to N create and transmit videos 1 to N to the tagging system 100 over network 101, while in other embodiments the tagging system 100 crawls the Internet via network 101 and automatically tags publicly available videos or those videos authorized to be tagged by third party publishers. In yet other embodiments, the tagging system 100 crawls and consumes videos for processing and receives videos from publishers for processing. All processing occurs through the exposed API 102 of the tagging system 100. The API 102 is the interface through which all external applications (and in some instances, internal engines, modules or the like) access functionality of the tagging system 100. For instance, storage calls to store data in the storage 110 may occur through the API 102, in addition to requesting video metadata 120 and generating video overlay 125.

While the videos 1 to N are generally served or streamed directly from publishers 1 to N, in some instances, the videos may be hosted by the tagging system 100 and accessed by devices $150_1$ to $150_P$ via the API 102.

Viewers view the videos 1 to N on any native video player provided by the publisher, while the video overlay 125 augments the video by providing per frame or per scene information extracted from the video metadata 120. In this manner, viewers are provided with information regarding what types of brands appear in a particular video at a particular time, what types of products appear, which people or television personalities, athletes and celebrities appear, or the like. The video metadata 120 is not limited to these categories. The video metadata 120 not only contains collections of characteristics of the video being displayed, but also contains a reference to which frame these collections are associated with, so that a user may be able to view any frame and find out about products or information shown in that frame. Additionally, the video overlay 125 is modified according to the data contained in the video metadata 120. In some instances, the video overlay 125 may alert the viewer to the presence of products in a particular scene of the video by offsetting a certain portion of the video scrubber, where the video scrubber is a video player timeline where the user can control which portion of the video is played.

Figure 2:
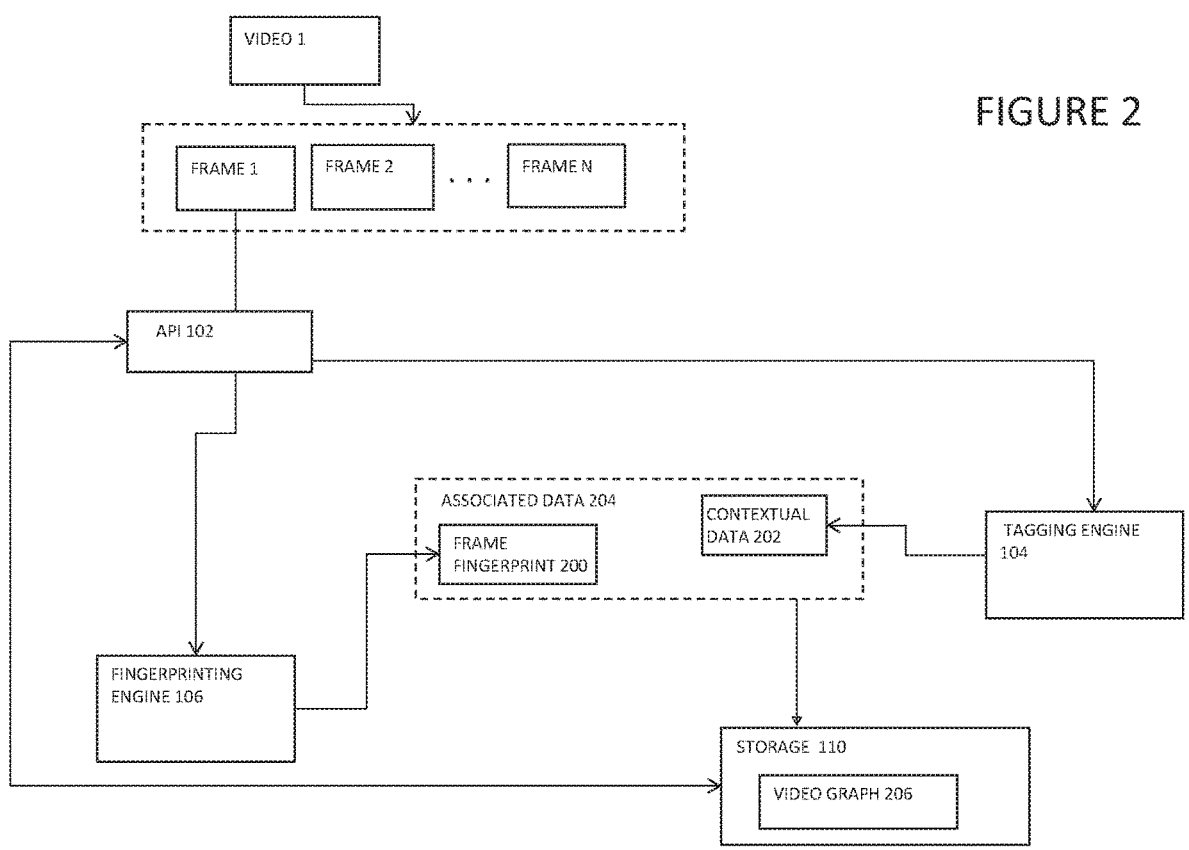
FIG. 2 is a block diagram of video tagging in accordance with exemplary embodiments presented herein.

FIG. 2 is a block diagram of video tagging in accordance with exemplary embodiments presented herein.

An example video 1 is comprised of several frames 1 to N. These frames played sequentially together provide the video viewing experience of someone using devices $150_1$ to $150_P$ of FIG. 1. These individual frames (or collections of frames) are coupled to the fingerprinting engine 106 and the tagging engine 104, synchronously or asynchronously. Each individual frame or collection of frames (delineated according to the video, or parameters of the tagging system 100) is processed by the fingerprinting engine 106 to generate a frame fingerprint 200.

Figure 3:
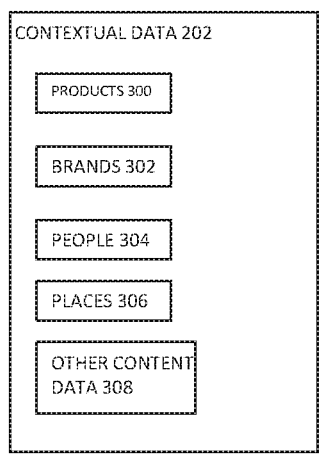
FIG. 3 is a block diagram of information stored in the videograph in accordance with exemplary embodiments presented herein.

Synchronously or asynchronously, the tagging engine 104 provides contextual data 202 relating to each of the frames. This contextual data 202 may be determined by computer vision algorithms scanning the video 1, manual tagging and recognition of characteristics of the video 1, or a combination of the two. The contextual data 202 and the frame fingerprint 200 form associated data 204. The tagging system 100 then stores the associated data 204 in storage 110 by making service calls to the video tagging API 102. In some embodiments, the associated data 204 is stored in a video graph 206. The video graph 206 is an efficient data structure which allows real-time search and extraction of contextual data such as contextual data 202 based on a frame fingerprint such as frame fingerprint 200. In embodiments, the contextual data 202 may comprise products 300, brands 302, people 304, places 306, and other content data 308 as shown in FIG. 3. The other content data 308 may include geographic location, external shopping links, biographical information, statistical data, or the like.

In some embodiments, the video tagging API 102 stores the video 1 in its entirety in storage 110 as raw video, or as fully tagged and fingerprinted video. In this manner, consumers of the videos can choose whether to use the tagging system 100 as a video host, or as a lightweight metadata (e.g., associated data 204) repository.

The API 102 is in some embodiments a set of services which provide interfaces for storage of associated data 204, storage of video 1, calls to the fingerprinting engine 106, calls to the tagging engine 104, receiving and forwarding calls to retrieve data from the storage 110.

FIG. 4A-4D are depictions of a user interface 400 in accordance with exemplary embodiments presented herein.

The user interface 400 comprises a video timeline 401, video scrubber 402, characteristics popup 404, a video time 406, volume controller 408 and the like.

The user interface 400 is an exemplary implementation of the video overlay 125 of FIG. 1. The user interface 400 is partially generated based on video metadata 120. In some instances, the user interface 400 is overlaid over any video that is played in a browser or through direct integration on devices 450 or via a browser plugin. The direct integration or browser or browser plugin may receive the user interface 400 from the tagging system 100 over network 101 via the API 102 shown in FIG. 1.

The video scrubber 402 can be controlled by a user to skip around to various times in the video being displayed on device 450. The video scrubber 402 appears "thicker" or different to distinguish it from the video timeline 401, which represents the entire length of the video. However, the difference in thickness may be manifest in some embodiments while absent from others.

When a viewer hovers there pointing device over a particular point in the video timeline 401, the video scrubber may relocate to that particular point and display a pop-up 404 which lists all of the characteristics for the frame being shown, as described in the video metadata 120. In some embodiments, the user interface 400 sends the currently playing frame to the tagging system 100 via the API 102 in order to retrieve the metadata 420, while in other embodiments the user interface 400 receives all of the metadata 420 for all frames when loading the video for playback.

The video timeline 401 and the video scrubber 402 may alternatively be referred to as a "wavelet", as their form represents a wave with a modulated amplitude. In this embodiment, the amplitude of the wavelet is modulated by how many characteristics are present in the video metadata 125 for the current frame 430. For example, if at time 2:24, frame 430 contains three recognized products, or brands, these products/brands are displayed in popup 404. In some embodiments, each of the recognized products/brands, or any related characteristics of the recognized products/brands, can be linked to the product/brand owner website, internal or external shopping website, informational website, search engine, or the like. If a viewer clicks the brand, they can be redirected to a link specified by the tagging system 100. In some instances, the external links is also contained within the video metadata 120.

Figure 4A:
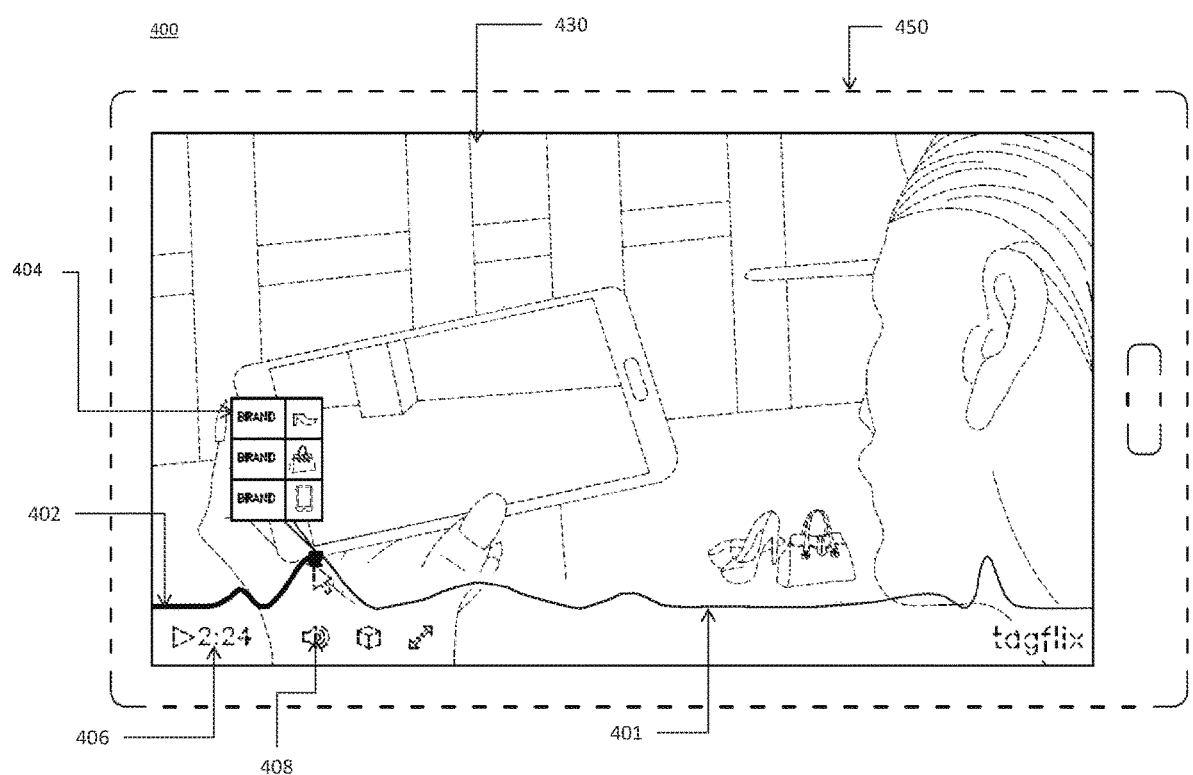
FIGS. 4A-4D depicts example user interfaces and video overlays in accordance with exemplary embodiments presented herein.
Figure 4B:
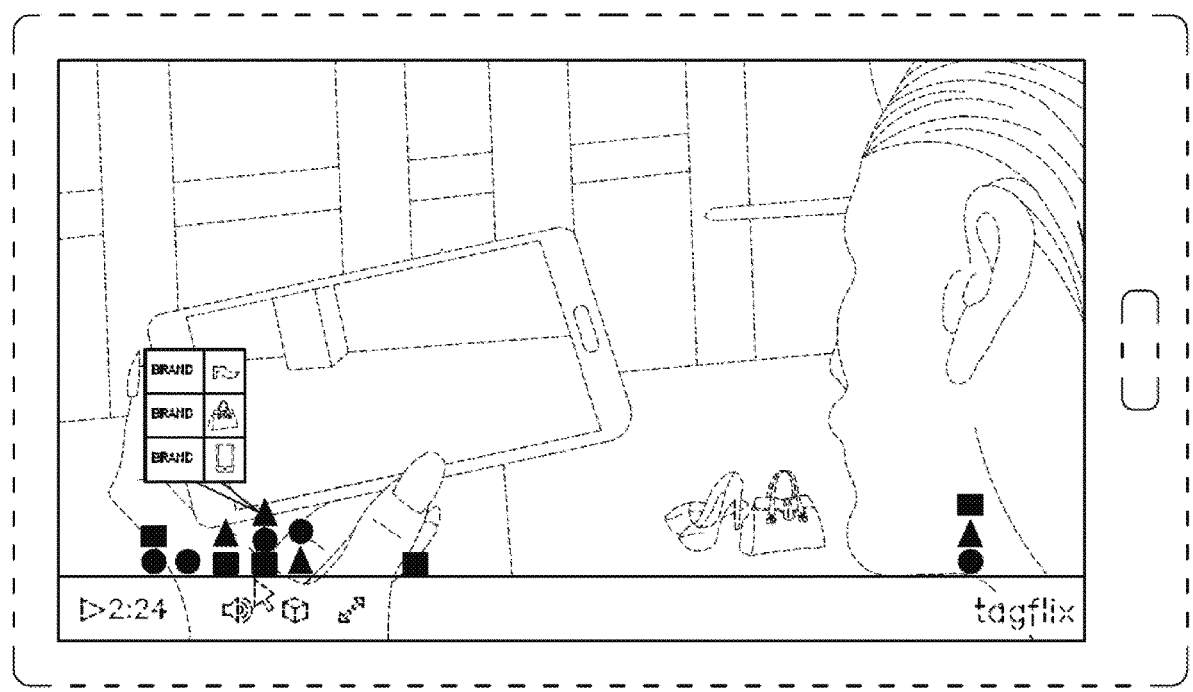
Figure 4C:
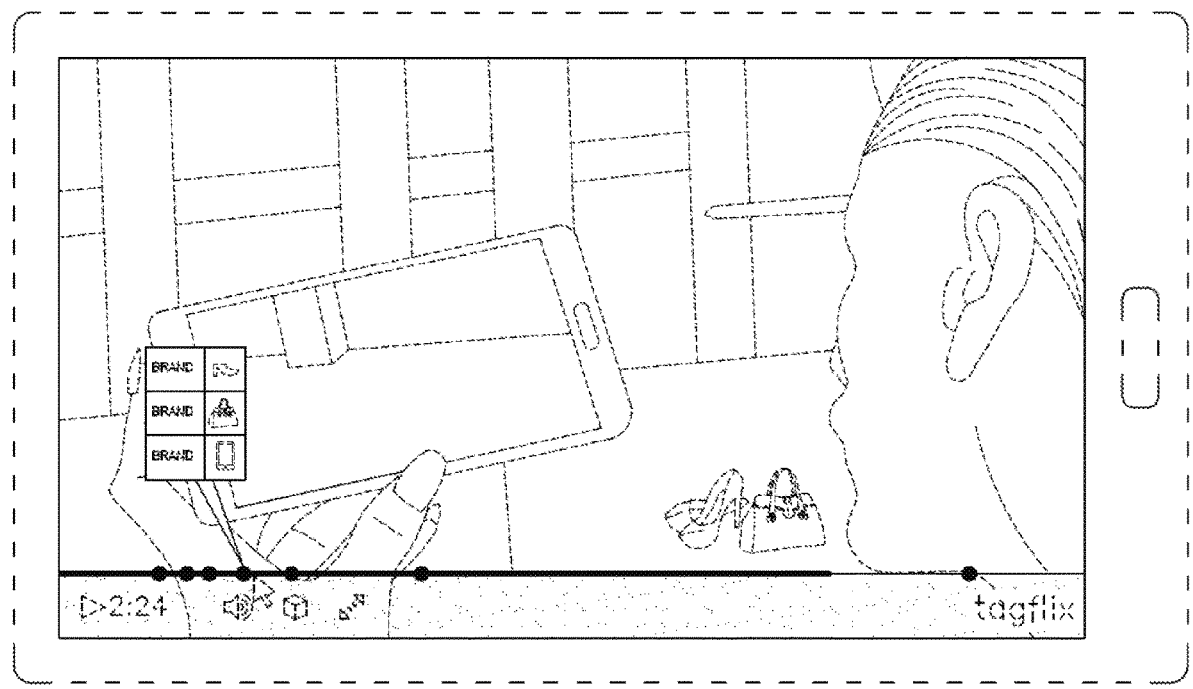
Figure 4D:
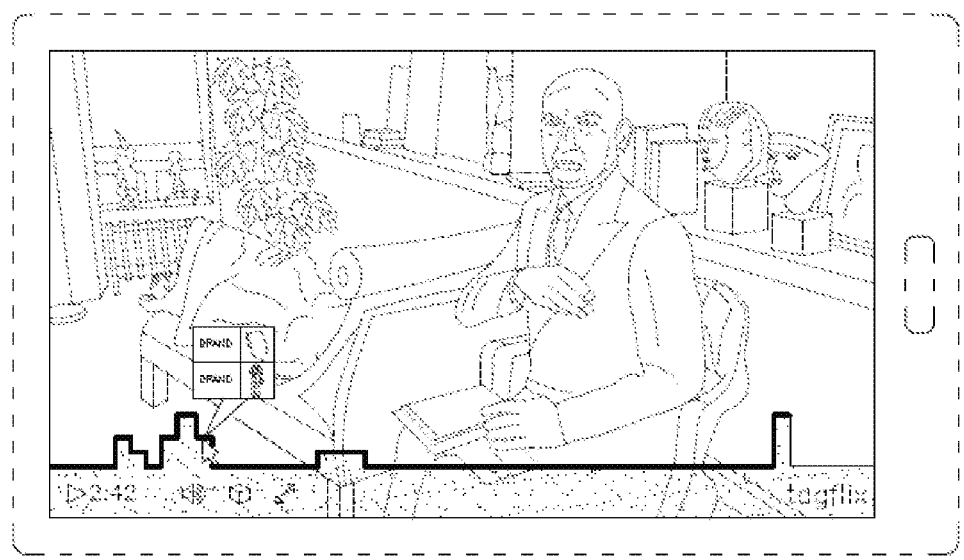

Other embodiments of the wavelet are shown in FIGS. 4B-4D, but function similarly with similar components. Specifically, in FIG. 4B, various symbols, icons, or geometric shapes may be used as video scrubber 402 to indicate where in the video timeline 401 recognized objects (e.g., products, brands, etc.) may be found. In some embodiments, icons of the brand/product shown in popup 404 may be used as the icons for video scrubber 402. FIG. 4C depicts an embodiment using a single indicator along the video timeline 401 which indicates where one or more recognized objects (e.g., products, brands, etc.) may be found. FIG. 4D depicts an embodiment using a step graph along the video timeline 401 as video scrubber 402 and indicates the location and number of recognized objects (e.g., products, brands, etc.) found within the video frame.

Figure 5:
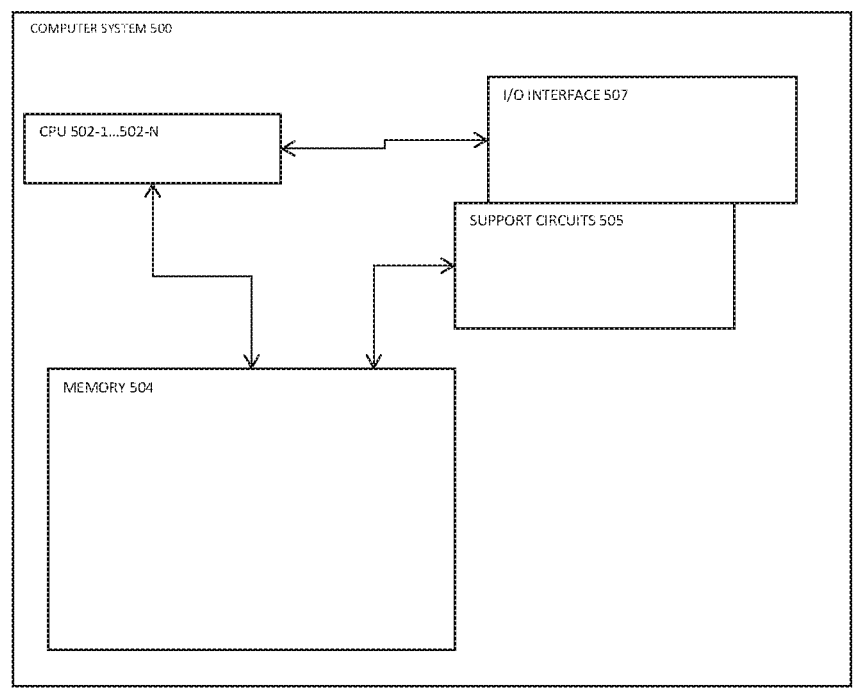
FIG. 5 is a block diagram of a computer system in accordance with exemplary embodiments presented herein.

FIG. 5 is a block diagram of a computer system 500 in accordance with exemplary embodiments presented herein. The computer system 500 includes one or more central processing units (CPUs) 502-1 to 502-N, various support circuits 505, and memory 504. The processors 502-1 to 502-N may include one or more microprocessors known in the art. The support circuits 505 for the processor 502 include conventional cache, power supplies, clock circuits, data registers, I/O interface 507, and the like. The I/O interface 507 may be directly coupled to the memory 504 or coupled through the support circuits 505. The I/O interface 507 may also be configured for communication with input devices and/or output devices such as network devices, various storage devices, mouse, keyboard, display, video and audio sensors and the like.

The memory 504, or computer readable medium, stores non-transient processor-executable instructions and/or data that may be executed by and/or used by the processors 502. These processor-executable instructions may comprise firmware, software, and the like, or some combination thereof.

The computer system 500, or several computer systems together, may be used to implement the tagging system 100 depicted in FIG. 1. Some portions of the tagging system 100 may be stored as computer software programs on memory 504, for execution by the CPU 502-1 to 502-N. Other portions of the tagging system 100 may be distributed across several computer systems, while having some portions in memory 504 while other portions of the software is stored on other memory.

The computer system 500 may be programmed with one or more operating systems, which may include OS/2, Linux, SOLARIS, UNIX, HPUX, AIX, WINDOWS, OSX, IOS, and ANDROID among other known platforms. The memory 504 may include one or more of the following: random access memory, read only memory, magneto-resistive read/write memory, optical read/write memory, cache memory, magnetic read/write memory, and the like, as well as signal-bearing media as described below.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Figure 6:
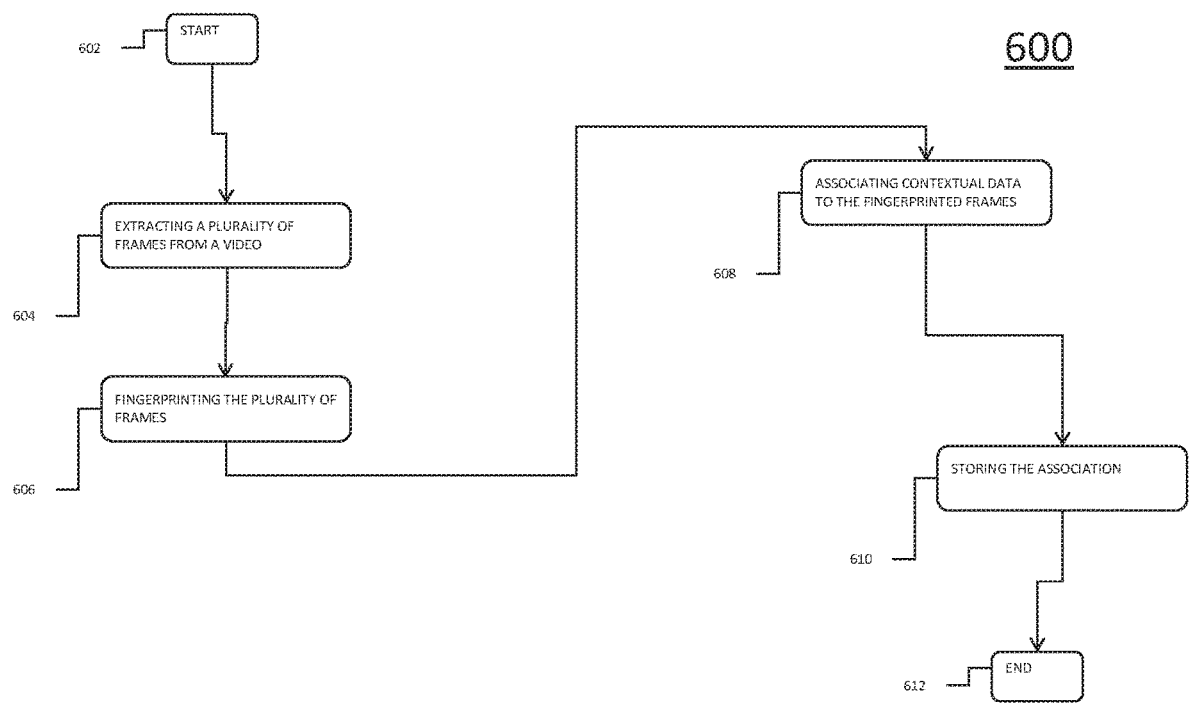
FIG. 6 is a flow diagram for a method for processing videos in accordance with exemplary embodiments presented herein.

FIG. 6 is a flow diagram for a method 600 for processing videos in accordance with exemplary embodiments presented herein.

The method 600 is a method performed by the tagging system 100 (implemented, for example, as the computer system 500 and executed by one or more processors 502-1 to 502-N) for processing videos.

The method 600 begins at step 602 and proceeds to step 604. At step 604, the tagging system 100 extracts a plurality of frames from a video. At step 606, the fingerprinting engine 106 generates a fingerprint for one, or a set of frames from the plurality of frames. At step 608, the tagging system 100 associates the fingerprint with contextual data determined within at least one frame or set of frames by the tagging engine 104. At step 610, the association between the fingerprint and contextual data is stored in storage 110. In some embodiments, the contextual data determined from the video may be transmitted to a third party service, such as the owner or representative of the product/owner, and the like. The method 600 ends at step 612.

Figure 7:
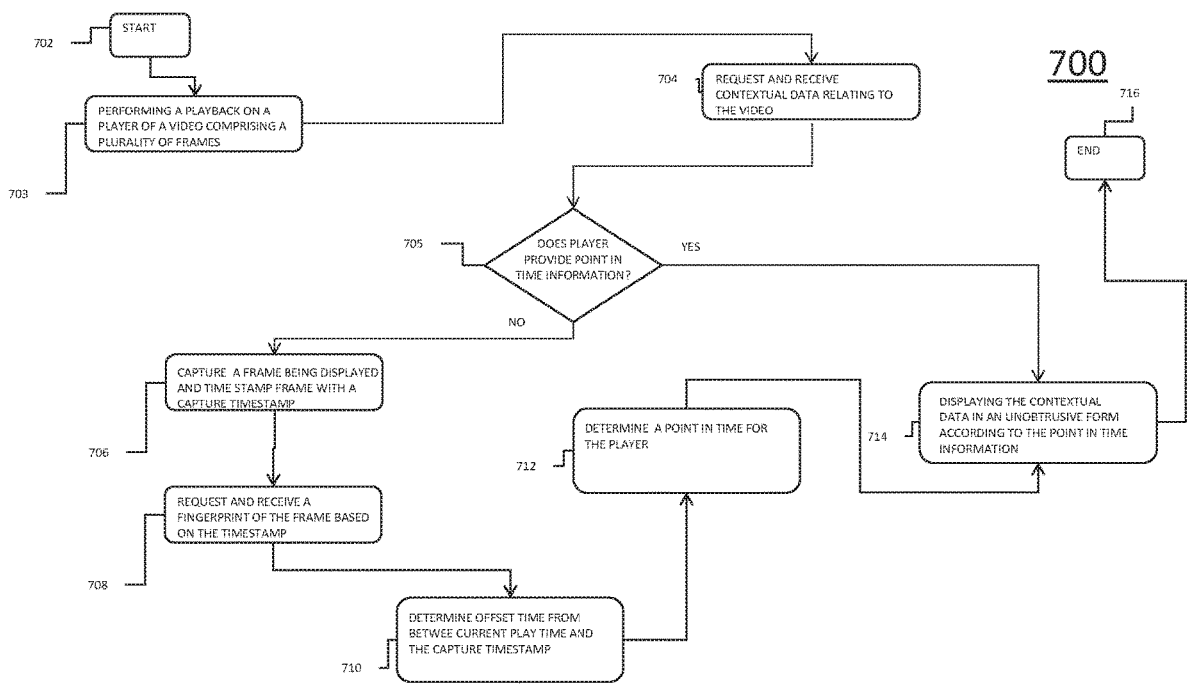
FIG. 7 is a flow diagram of a method for retrieving contextual information related to a video in accordance with exemplary embodiments presented herein.

FIG. 7 is a flow diagram of a method 700 for retrieving contextual information related to a video in accordance with exemplary embodiments presented herein.

The method 700 is a method performed by the video overlay 125 (which may be implemented using a computer system such as computer system 500 and executed by one or more processors 502-1 to 502-N) overlaid atop a video player such as YOUTUBE™, VIMEO™, BRIGHTCOVE™, JWPLAYER™ and the like which return "point in time information", or video players which do not return point-in-time information.

The method 700 begins at step 702 and proceeds to step 703. At step 703, a video player performs a playback of a video comprising a plurality of frames. The method then proceeds to step 704, where contextual data relating to the video is requested by the overlay 125 and received from a server (e.g. system 100 via API 102). According to some embodiments the contextual data is received in the form of a full data structure with data relating to all points in time in the video. In other embodiments, the contextual data is received in chunks at the video overlay 125 in order to improve performance of the overlay 125 and reduce network bandwidth.

At step 705, the video overlay 125 determines whether the player provides point in time information or not. When the video player does provide point in time information, the method proceeds to step 714. At step 714, the video overlay 125 displays the contextual data in an unobtrusive form as the frame is currently being displayed, so that users may find out more information relating to what is currently appearing in the frame. In some instances, this information may comprise products, brands, people, external shopping links, biographical information, statistical data, geographical location or the like. The method 700 ends at step 716.

When the video player does not provide point in time information at step 705, the method 700 proceeds to step 706.

At step 706, the video overlay 125 captures a frame from the plurality of frames being displayed at the current time, and timestamps that frame with a capture timestamp. The capture timestamp (point A in FIG. 9) represents the time at which the video overlay 125 captures the frame.

Figure 9:
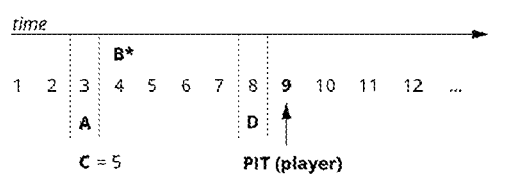
FIG. 9 depicts a timeline with the points in time described with respect to FIG. 7 in accordance with exemplary embodiments presented herein.

At step 708, the video overlay 125 requests and receives a fingerprint point in time (point B in FIG. 9) of the frame based on the captured frame and then at step 710, the method proceeds to determine an offset time (point C in FIG. 9) between a point in time when data should start syncing (point D in FIG. 9) and the capture timestamp (point A in FIG. 9). The offset time (point C) calculation occurs whenever a video is started or the play-head is adjusted, for example if a user pauses and starts the video again.

At step 712, the video overlay 125 determines the video player point in time (at time 9 in FIG. 9) by adding the point in time for the fingerprint of the frame (point B in FIG. 9) and the offset time (point C in FIG. 9).

The method then proceeds to step 714. At step 714, the video overlay 125 displays the contextual data in an unobtrusive form as the frame is currently being displayed, so that users may find out more information relating to what is currently appearing in the frame. In some instances, this information may comprise products, brands, people, external shopping links, biographical information, statistical data, geographical location or the like. The method 700 ends at step 716.

Figure 8:
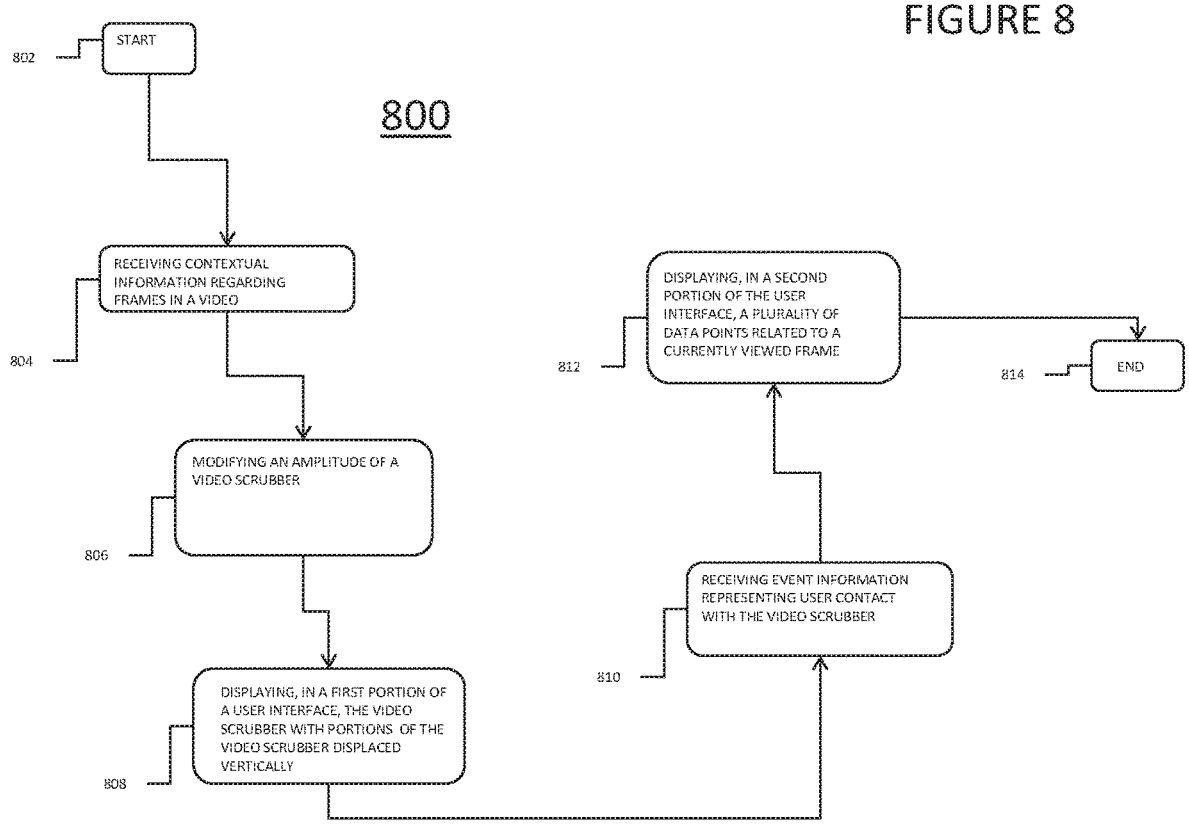
FIG. 8 is a flow diagram for a method for presenting contextual information in accordance with exemplary embodiments presented herein.

FIG. 8 is a flow diagram for a method 800 for presenting contextual information in accordance with exemplary embodiments presented herein.

The method 800 is a method performed by the video overlay 125 (which may be implemented using a computer system such as computer system 500 and executed by one or more processors 502-1 to 502-N).

The method begins at step 802 and proceeds to step 804.

At step 804, the video overlay 125 receives contextual information regarding frames in a video currently being displayed in a browser, or a video player, by a user of a device. At step 806, the video overlay 125 modifies the amplitude of its video scrubber (e.g., video scrubber 402) at a certain fixed point in time, not based on the current timestamp of the video, but based on video metadata retrieved from the tagging system 100 based on a fingerprint of the frame or scene currently being displayed. For example, if there is no video metadata, or no tags, in a particular frame, the amplitude will remain the same. If there are three items in the metadata, the amplitude of the frame will be increased to a particular threshold, while the portion of the video scrubber corresponding to frames leading to the current frame will also have their amplitudes increased gradually to the threshold. Similarly, portions of the video scrubber after the current frame (or scene) will transition from the particular threshold amplitude to whichever amplitude is appropriate for the next frames according to the information in the metadata. For example, if the current scene contains three products and a next scene contains only 2 products, the video scrubber will rise to a particular threshold, then drop by one third of that particular threshold, and then finally drop down to a "flat" baseline level of the video scrubber corresponding to no items in the metadata.

According to exemplary embodiments, the amplitude of the video scrubber is determined according to a percentage calculated by comparing how many products are in the currently playing frame with the maximum number of products in any of the frames. This generates a "wavelet" that actually represents a fingerprint for the entire video, as each video will have different products, brands, people, and the like, in the video, and the fingerprint can be used as an efficient and fast way to perform a first heuristic check on the video. Each video also has sub-wavelets when filtered by entity types (e.g., brands, products, people, etc.). Alternatively, a single wavelet may contain one entity (i.e., all brands), which is a different wave from the same video. Thus the wavelet representing those objects and the occurrence of those objects across the entire timeline of the video can help in identifying the video. In some embodiments, this can be used to perform a quick comparison between two videos to avoid duplicate processing by the system 100 or act as a visual cue for users.

The method then proceeds to step 808, where the video overlay is displayed with a video scrubber with a displaced vertical height (e.g., a modulated amplitude) in a first portion of the user interface. In exemplary embodiments, the first portion of the user interface is a lower portion aligned with a bottom portion of a displaying video.

At step 810, the video overlay emits interactive and non-interactive event information captured by the API 102 which represents user contact with the video scrubber or other parts of the overlay. For example, the event may be a user mouse-over, a tap/touch on a touchscreen device or the like. The event information may contain brand or product exposure data for the specific location of the event on the video scrubber or non-interactive event data such as video ready for playing.

Given this event information, the method proceeds to step 812, where in a second portion of the video overlay (user interface), a plurality of data points related to the frame associated with the event information. For example, if the user moves the cursor to a prior frame and performs an event such as a click event, if data points (e.g., contextual data, or metadata regarding that frame) exist for that frame, those data points, characteristics, etc., will be displayed in a second portion of the video overlay in a non-obtrusive manner. For example, in one embodiment, the data points are displayed directly above the location of the user event. In some embodiments, the data points are displayed in a manner similar to that shown in FIG. 4A-4D, showing particular items and their associated brands. The method then ends at step 814.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments presented herein, other and further embodiments may be devised without departing from the basic scope thereof, and the scope thereof is determined by the claims that follow.

The invention claimed is:

1. A method for presenting contextual information related to a video, the method comprising: receiving contextual information related to one or more frames in a video currently being displayed in a user interface on a display screen; modifying an amplitude of a video scrubber based on an amount of video metadata received based on a fingerprint of the frame or scene currently being displayed; displaying, in a first portion of the user interface, the video scrubber with portions of the video scrubber displaced vertically reflecting the modified amplitude; receiving event information representing a user selection of a portion of the video scrubber; and displaying, in a second portion of the user interface, a plurality of data points related to the frame being displayed.

2. The method of claim 1, wherein the data points represent the contextual information received related to the currently viewed frame is based on timestamp information related to the frame being displayed.

3. The method of claim 1, wherein the amplitude of the video scrubber is determined according to a percentage calculated by comparing how many products are in the frame being displayed with a maximum number of products in any of the frames.

4. The method of claim 3, wherein the modified amplitudes of the video scrubber over an entire timeline of the video generates a wavelet that represents a fingerprint for the entire video.

5. The method of claim 1, wherein the fingerprint is a unique identifier generated for each of the one or more frames.

6. The method of claim 1, wherein the fingerprint is generated based on information related to the one or more frames.

7. The method of claim 1, wherein the contextual information related to the one or more frames is determined by computer vision algorithms scanning and analyzing the video for contextual data.

8. The method of claim 1, wherein the contextual information related to the one or more frames is determined by manual tagging and recognition of characteristics of the video.

9. The method of claim 1, wherein the contextual information related to the one or more frames is determined by computer vision algorithms scanning and analyzing the video for contextual data, and by manual tagging and recognition of characteristics of the video.

10. The method of claim 9, wherein data related to the manual tagging and to the contextual information is stored in a video graph configured to allow real-time search and extraction of contextual information.

11. The method of claim 1, wherein the contextual information includes at least one of products, brands, people, places, external shopping links, biographical information, geographical location or statistical data.

12. The method of claim 1, further comprising: transmitting the contextual information to a third-party service.

13. The method of claim 1, wherein the contextual information related to the one or more frames being displayed is received in the form of a full data structure with data relating to all points in time in the video.

14. The method of claim 1, wherein the contextual information related to the one or more frames being displayed is received in chunks configured to improve performance and reduce network bandwidth.

15. The method of claim 1, wherein receiving the contextual information related to the one or more frames being displayed is performed via an Application Programing Interface (API) call to a tagging system.

16. The method of claim 1, wherein the fingerprint is based on timestamp information related to the one or more frames.

* * * * *